UNITED STATES PATENT OFFICE.

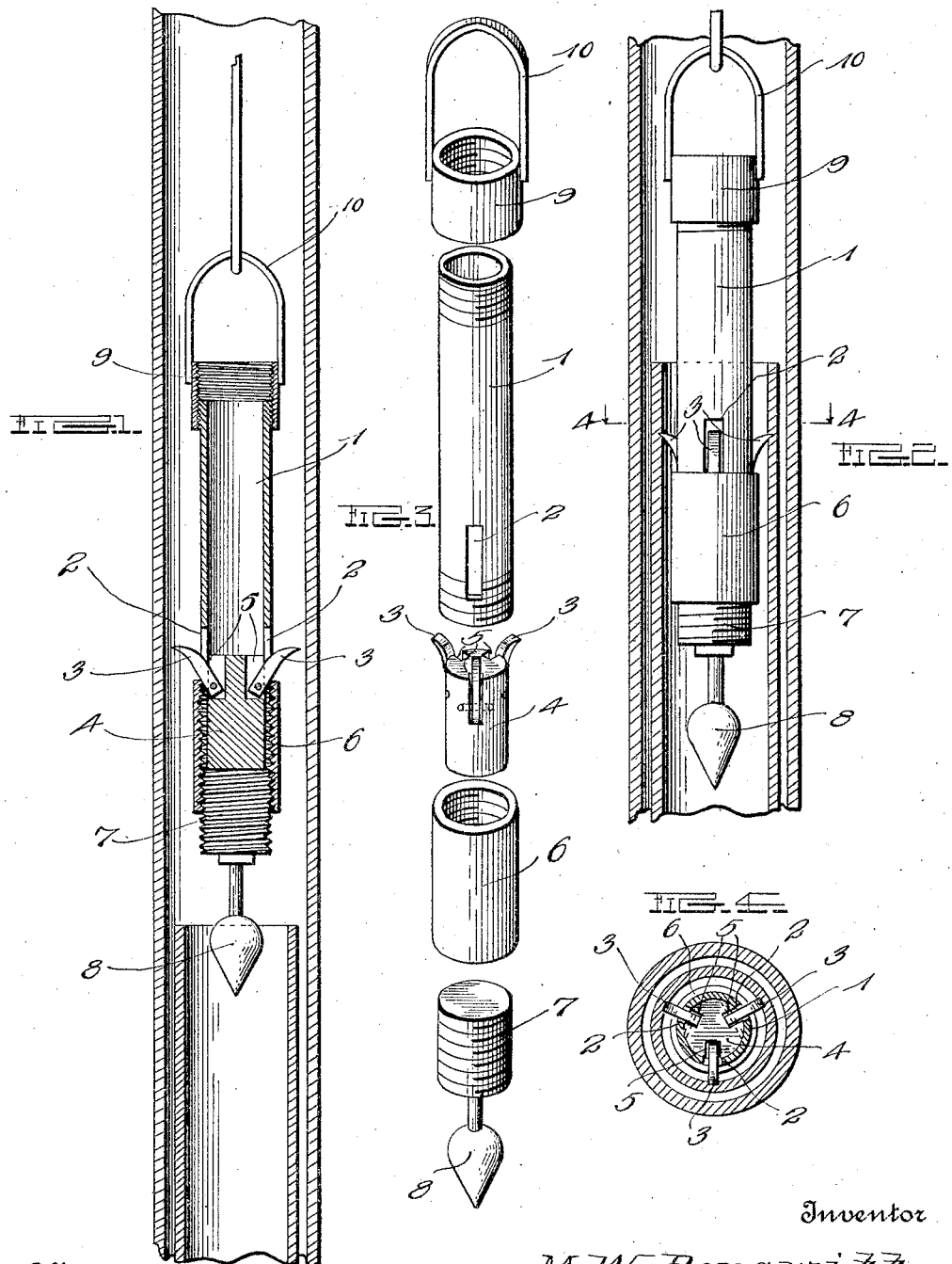

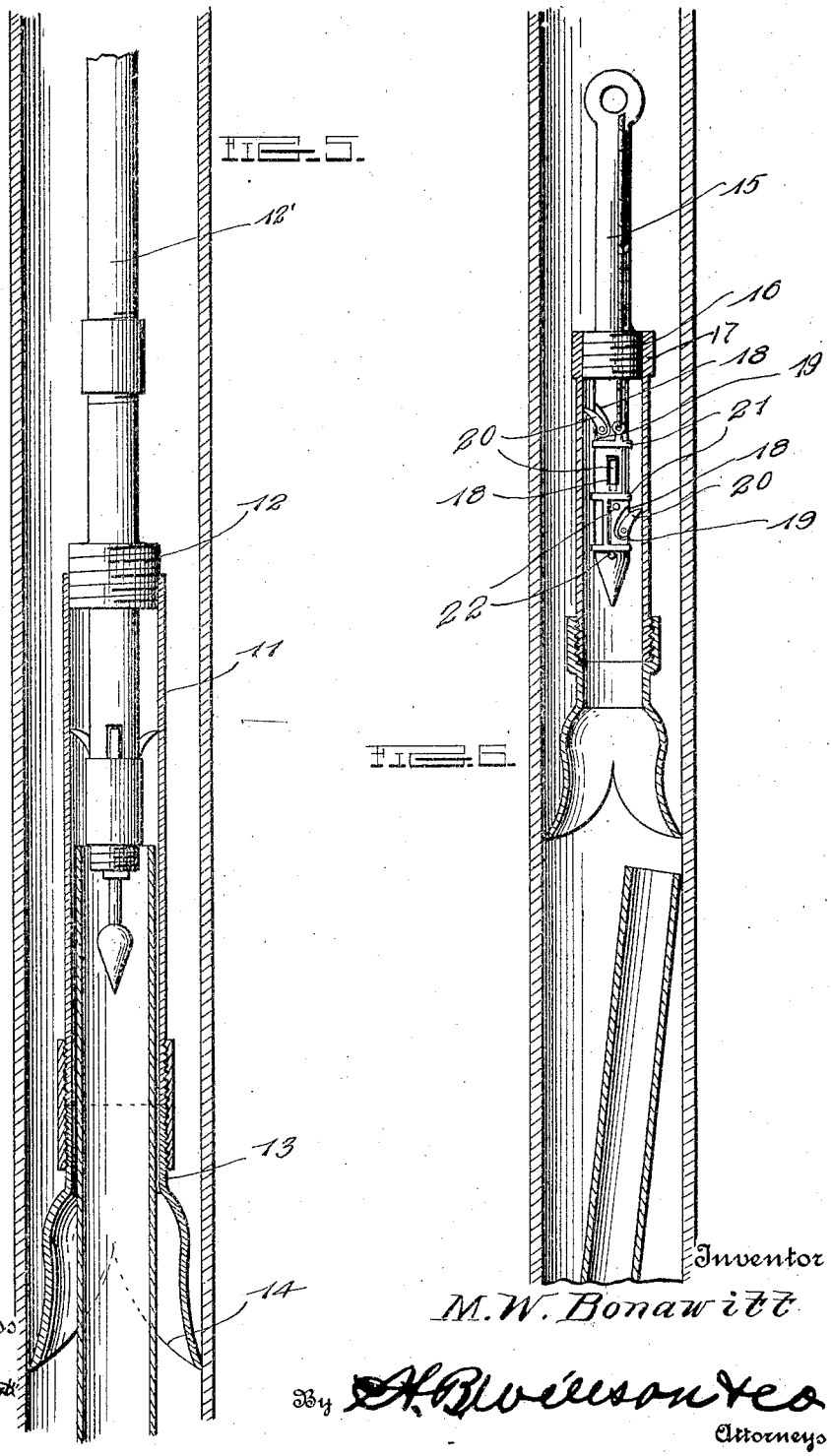

MYRON W. BONAWITT, OF TOLEDO, OHIO.

PIPE-FISHING TOOL.

1,363,226.

Specification of Letters Patent. Patented Dec. 28, 1920.

Application filed December 29, 1919. Serial No. 348,061.

*To all whom it may concern:*

Be it known that I, MYRON W. BONAWITT, a citizen of the United States, residing at Toledo, in the county of Lucas and State of Ohio, have invented certain new and useful Improvements in Pipe-Fishing Tools; and I do declare the following to be a full, clear, and exact description of the invention, such as will enable others skilled in the art to which it appertains to make and use the same.

This invention relates to improvements in pipe fishing tools.

The primary object is to provide a simple and practical device of this character, one capable of use in removing various sized pipe and tools lost in wells.

With the above and other objects in view, the invention consists of certain novel features of construction and the combination and arrangement of parts as will be more fully described and claimed.

I attain these objects by the construction illustrated in the accompany drawing, in which—

Figure 1, is a vertical sectional view of the tool inserted in a well casing;

Fig. 2, is a side elevation thereof;

Fig. 3, is a perspective view of the parts ready for assembling;

Fig. 4, is a sectional view taken on the line 4—4 of Fig. 2;

Fig. 5, is a vertical sectional view of a slightly modified form; and

Fig. 6, is a combined section and elevation of a further modified form.

Similar reference numerals designate similar parts throughout the several views.

Reference is now had to Figs. 1 to 4 inclusive in which is shown a form adapted for use in removing pipes of comparatively large diameter.

In this form, I employ an elongated pipe section 1, provided near its lower end with a series of annularly spaced vertical slots 2, through which are adapted to project a series of biting teeth 3, said teeth being pivoted to a block 4. The block 4 is of a diameter slightly less than that of the pipe section in whose lower end it is inserted. The biting teeth are pivoted at their lower ends in suitable recesses 5, which open through the upper end and sides of said block 4.

An internally threaded collar 6 is adapted to be connected to the lower externally threaded end of said pipe section. A threaded cylindrical block 7 carrying a depending spear 8 or other similar centering device is screwed into the threaded collar 6, said collar and threaded block being adjustable on the pipe section 1 to vary the extent of projection of the teeth 3.

A collar 9 carrying an inverted substantially U-shaped bail 10 is connected to the upper end of the pipe section to provide means for securing one end of a cable or rope to the tool.

It is very apparent that in using this tool, the projection of the teeth must be varied according to the diameter of the pipe to be removed from a well. As before stated this variation is accomplished by adjusting the collar 6 and threaded block 7 with relation to the pipe section. The tool is lowered into a well and when it projects into a pipe and is pulled up, the teeth bite into the inner face of the pipe, pulling it up at the same time.

Since pipes vary in diameter, and the heretofore described form probably would not work efficiently on a very small pipe, I provide a sleeve 11 of comparatively large diameter, said sleeve being internally threaded at its upper end for engagement with a threaded annular rib 12 formed on the body 1 as shown in Fig. 5. The lower end of the sleeve 11 is provided with a removable enlarged and substantially bell-shaped portion 13, the lower edge of which is provided with a large substantially inverted V-shaped notch 14.

In using this form, a pipe whose upper end is leaning into contact with a well casing or wall may be positioned between the sides of said notch 14, after which, through rotating the pipe 12 which extends to the well surface the entire tool may be given a half turn to move the pipe end into the bell-shaped portion. After the foregoing operation the tool may be lowered to engage the biting teeth with the pipe for removing it.

An additional modification is shown in Fig. 6, in which is shown a single elongated solid body 15, the lower end of which is tapered to form a centering device whose function is the same as that of the spear 8. Intermediate the ends of the body 15 is formed a threaded annular rib 16 for connecting the body 15 to a sleeve 17 whose structure and use are the same as the hereinbefore described sleeve 11. The upper end of the body 15 is provided with an eye in which is secured any suitable element for raising and lowering the tool.

Circumferentially and longitudinally spaced around the body 15 are recesses 18 which extend downwardly and inwardly thereby forming stops 19 on the lower wall of the entrance to each recess. Pivoted in each recess is a biting tooth 20 whose outer end projects beyond the side of the body, the extent of projection being limited by said stops 19.

It is obvious that some pipes cannot possibly be removed and in order that the teeth may be disengaged from the pipe, a plurality of connected vertically spaced rings 21 are provided. Each ring is positioned below a tooth, and the entire set of rings may be raised or lowered by means of a rope or cable which is connected to a short bar or finger carried by the upper ring. It is readily seen that by raising the rings the teeth will be retracted and the tool may there be withdrawn. Stops 22 are provided to limit the movement of said rings.

From the foregoing description taken in connection with the accompanying drawing, the construction and operation of the invention will be readily understood without requiring a more extended explanation.

Various changes in the form, proportion and minor details of construction may be resorted to, without departing from the principle or sacrificing any of the advantages of the claimed invention.

I claim:

1. A tool of the class described comprising a hollow body having a threaded lower end portion and provided with longitudinally extending slots adjacent its lower end, a sleeve screwed upon the lower end of the body, a plug screwed into the lower end portion of the sleeve, a block slidably mounted in the sleeve and lower end portion of the body and resting upon the plug and having its upper end portions provided with side pockets, and engaging teeth pivotally mounted in the pockets of the block and extending through the slots of the body for engaging the inner face of a pipe, adjustment of the plug in the sleeve raising and lowering the block and regulating the angle of the teeth when extended through the slots of the body.

2. A tool of the class described including an elongated pipe section having slots in its sides, a cylindrical block insertible in the lower end of said pipe section, a plurality of annularly spaced biting teeth carried by said block, said teeth extending upwardly and outwardly from said block, said teeth being adapted for projection through said slots, a collar adapted to be threaded onto the lower end of said pipe section, a threaded cylindrical block receivable in the lower end of said collar, a spear depending from the threaded block, said collar and block being adjustable to vary the outward projection of said teeth, and a bail carried by the upper end of said pipe section.

3. A tool of the class described comprising a hollow body having side slots, a block slidable longitudinally within the body, pipe engaging teeth pivotally connected with the block and extendible through the slots of the body, and means for supporting the block adjustably mounted in the hollow body and supporting the block at a pre-determined point with the teeth extending through the slots at a pre-determined angle.

In testimony whereof I have hereunto set my hand in the presence of two subscribing witnesses.

MYRON W. BONAWITT.

Witnesses:
MYRTLE G. BLOCK,
PETER J. CALLAGHAN.